United States Patent [19]

Wiewiorowski et al.

[11] Patent Number: 4,655,790
[45] Date of Patent: Apr. 7, 1987

[54] PHOSPHORIC ACID CRYSTALLIZATION PROCESS

[75] Inventors: Tadeusz K. Wiewiorowski; Vivian C. Astley, both of New Orleans, La.

[73] Assignee: Freeport Research and Development Company, New York, N.Y.

[21] Appl. No.: 731,970

[22] Filed: May 8, 1985

[51] Int. Cl.$^4$ .............................................. B01D 9/02
[52] U.S. Cl. ........................................ 23/299; 23/301; 423/321 R
[58] Field of Search ...................... 23/295 R, 296, 297, 23/299–301; 423/316, 317, 321 R; 62/532, 536

[56] References Cited

U.S. PATENT DOCUMENTS

| | | |
|---|---|---|
| 1,283,398 | 10/1918 | Carothers et al. |
| 2,813,777 | 11/1957 | Swensen ........................... 23/301 R |
| 2,847,285 | 8/1958 | Pahud . |
| 2,857,246 | 10/1958 | Malowan . |
| 3,284,171 | 11/1966 | Harper . |
| 3,333,929 | 8/1967 | Mazurek et al. |
| 3,642,439 | 2/1972 | Moore et al. |
| 3,679,374 | 7/1972 | Kovacs . |
| 3,853,486 | 12/1974 | Heymer et al. |
| 3,890,097 | 6/1975 | Minor . |
| 3,912,803 | 10/1975 | Williams et al. |
| 3,947,499 | 3/1976 | Edwards et al. |
| 4,083,934 | 4/1978 | Lowe et al. |
| 4,215,098 | 7/1980 | Lowe et al. |
| 4,243,643 | 1/1981 | Mills . |
| 4,278,648 | 7/1981 | Walton . |
| 4,296,082 | 10/1981 | Lowe et al. |
| 4,299,804 | 11/1981 | Parks et al. |
| 4,332,592 | 6/1982 | Müller ............................. 23/301 R |
| 4,487,750 | 12/1984 | Astley et al. ..................... 423/321 R |

FOREIGN PATENT DOCUMENTS

| | | |
|---|---|---|
| 14692 | 6/1969 | Japan . |
| 1436115 | 5/1976 | United Kingdom . |
| 2078694 | 1/1982 | United Kingdom ............ 423/321 R |

OTHER PUBLICATIONS

W. Ross et al, The Purification of Phosphoric Acid by Crystallization, Industrial and Engineering Chemistry, Oct. 1925, pp. 1081–1083.
C. Y. Shen, Production of Crystalline Pyrophosphoric Acid and Its Salts, Industrial & Engineering Chemistry, Process Design and Development, vol. 14, No. 1, pp. 80–85, Jan. 1975.
N. J. J. Huige et al, Production of Large Crystals by Continuous Ripening in a Stirrer Tank, Journal of Crystal Growth 13/14, May 1972, pp. 483–487.
E. J. Lowe—"Purification of Wet-Process Phosphoric Acid".
R. F. Johnson—"Phosphoric Acid", vol. 1, Part II, published by Marcel Dekker—1968.
Conf. Proceeding in Japan on "Purification of Phosphoric Acid Hemihydrate by Crystallization", Yoshi Aoyama, et al—1976.

Primary Examiner—David L. Lacey
Attorney, Agent, or Firm—Brumbaugh, Graves, Donohue & Raymond

[57] ABSTRACT

The present invention relates to the processing of phosphoric acid by crystallization. Wet-process phosphoric acid is purified by cooling it to supersaturated conditions and adding relatively large amounts of fine, relatively pure seed crystal. Crystallization thereafter proceeds under conditions which substantially favor crystal growth on the seeds which are added and disfavor secondary nucleation. To prevent the crystallizing magma from reaching a viscosity which would render further processing difficult, the present invention provides for recycling raffinate in an amount sufficient to maintain the solids content of the crystallizing magma below about 40%.

5 Claims, 1 Drawing Figure

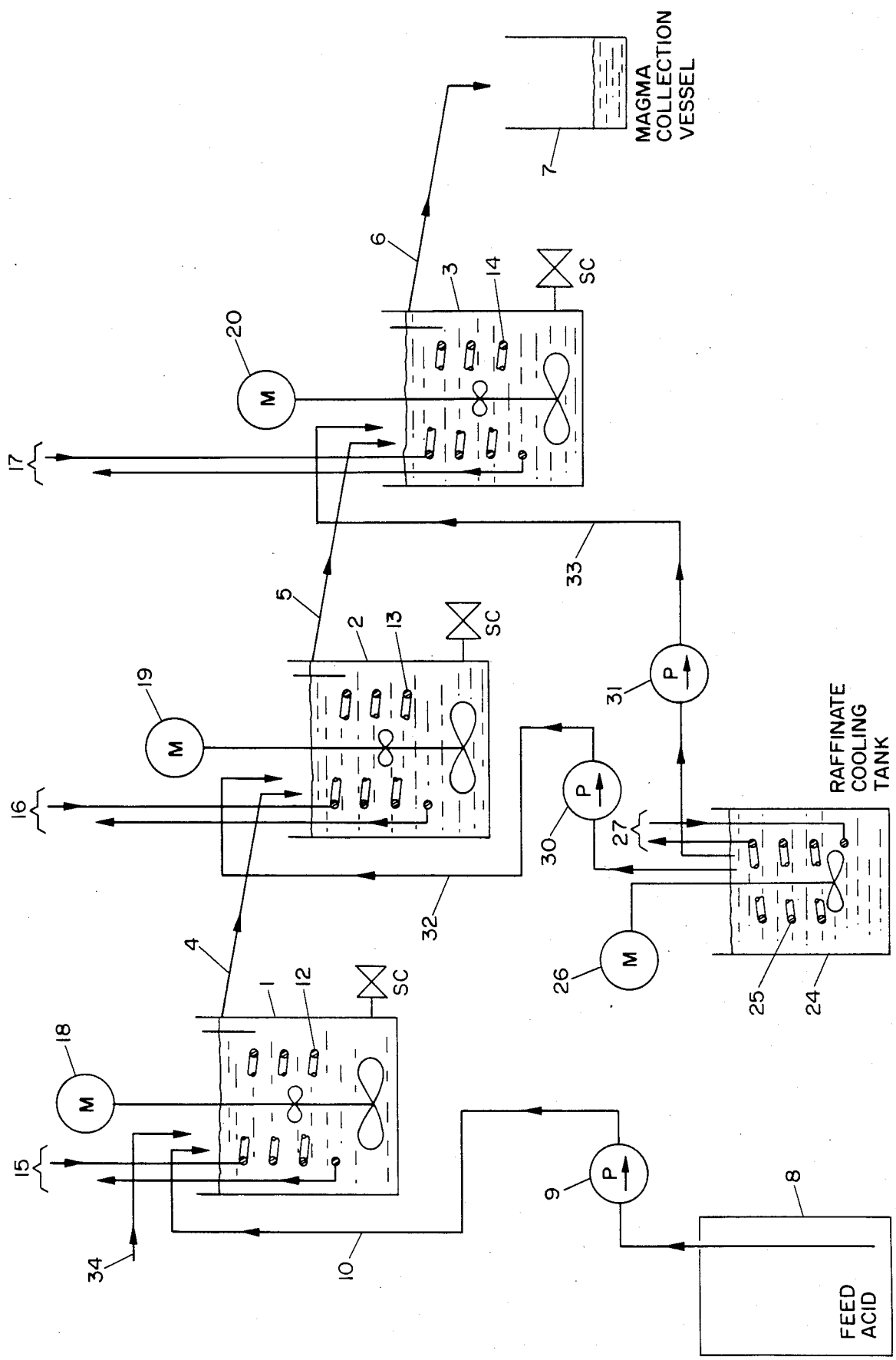

PHOSPHORIC ACID CRYSTALLIZATION PROCESS

BACKGROUND OF THE INVENTION

1. Field of the Invention

This invention relates to the production of purified phosphoric acid and, in particular, to the production of concentrated high-purity phosphoric acid.

2. THE PRIOR ART

Most of the high-purity phosphoric acid on the market today is produced by the so-called furnace process, which involves the production of elemental phosphorus in an electric furnace from phosphate rock and coal. The elemental phosphorus is then burned and the resulting phosphorus pentoxide is hydrolyzed to high purity phosphoric acid. This technology is generally costly and very energy intensive. Efforts have been made in the past to develop technology for the production of high-purity phosphoric acid from impure acids, such as wet-process acid. Wet-process acid is produced via the acidulation of phosphate rock with sulfuric acid, and is less expensive to make. Such acid, however, is contaminated with significant concentrations of numerous impurities, such as iron, aluminum, magnesium, sulfate, fluorine and silica. Other impure acids with similar impurities are available "spent acids", that is, acids which, regardless of their original manufacture or purity, e.g., furnace process or wet-process, have been used ("spent") in such industrial applications as metal finishing or in catalyst applications.

While crystallization of the phosphoric acid would normally be considered as a process which would result in a crystallized product of relatively high purity (leaving behind a raffinate containing the rejected impurities), crystallization has not been practiced on an industrial scale for purifying wet-process acid, or for purifying other impure acids. Apparently crystallization has not been commercially accepted because of great difficulty in controlling the rate of crystallization. When the impurities normally associated with wet-process or spent acids are present, the impure acid can withstand very substantial cooling, well into the supersaturation region, before crystallization occurs. Even then spontaneous crystallization can be an extremely slow process. However, once crystals are formed by spontaneous (primary) nucleation, or if seed crystals are added in amounts substantially lower than the amounts used in the method of this invention, the impure acid tends to crystallize relatively rapidly (presumably by secondary nucleation) to a putty-like intractable mass which has a viscosity typically in excess of 50,000 centipoises and which cannot be further processed or separated. This rapid crystallization of phosphoric acid into a putty-like intractable mass is hereinafter referred to as "catastrophic crystallization".

A number of processes have been proposed for removing impurities from phosphoric acid by either extraction or crystallization. For example, U.S. Pat. No. 3,642,439 describes an attempt to provide a process for upgrading the purity of wet-process phosphoric acid. In this process the inventors claim that magnesium can be selectively removed from the wet-process acid via the crystallization of magnesiumcontaining precipitates. The examples cited in the '439 patent indicate that the efficiency of the process is very limited. The magnesium content before the precipitation step in one of the examples was 0.4%, while after the crystallization and filtration the magnesium content of the purified acid was 0.2%. Thus, the process facilitates only the removal of about 50% of the magnesium content in the feed acid and does practically nothing to remove other impurities contained in the wet-process phosphoric acid.

U.S. Pat. No. 4,299,804 describes another process for the removal of impurities from wet-process phosphoric acid by crystallization. In this case magnesium and aluminum impurities are claimed to be removed in the form of a magnesiumaluminum fluoride. Magnesium removal efficiencies of up to 90% are indicated by the examples; however, aluminum removal effectiveness is generally much poorer and the product still contains the other impurities such as iron, sodium, silica and fluoride. The examples indicate that the efficiency of the aluminum and magnesium removal process varies from sample to sample.

U.S. Pat. No. 4,243,643 refers to another process for the removal of metallic ion impurities from wet-process phosphoric acid. This process also suffers from several distinct disadvantages. It requires the use of a precipitant comprising ions of calcium and fluorine to cause the precipitation of magnesium from the acid, and it requires that the sulfate concentration of the acid exceed 2%. Even then the effectiveness of the process is only of the order of about 50% for magnesium and even lower with respect to other metallic impurities present in the wet-process acid, such as iron, aluminum and sodium.

U.S. Pat. No. 3,890,097 concerns a process for the purification of wet-process phosphoric acid which involves the crystallization from wet-process acid of a $P_2O_5$-containing entity rather than of the impurities. This patent suggests the addition of a quantity of sulfuric acid to wet-process phosphoric acid in an amount sufficient to raise the concentration of sulfuric acid in the solution to a range of from about 10% to 15% by weight. The '097 patent points out that crystallization of wet-process acid is impractical because of the low temperatures required and the high viscosities which occur. The addition of sulfuric acid to the impure phosphoric acid is claimed to lower its viscosity and increase its freezing point. The distinct disadvantage of this process lies in the need for the addition of costly sulfuric acid which is used to modify the physical characteristics, specifically the freezing point and the viscosity, of the phosphoric acid solution from which the purified material is crystallized. As a consequence of this sulfuric acid addition, the sulfuric acid content of the purified phosphoric acid is relatively high, that is, over 1% by weight, and the process is further burdened by a higher water content in the raffinate which carries about 50% of the original $P_2O_5$ values.

British Pat. No. 1,436,115 also makes reference to crystallization in purifying wet-process phosphoric acid. In this patent, however, the need to first purify the wet-process acid by solvent extraction is stressed. The disclosure teaches that it is not in fact practicable to produce a purified phosphoric acid by direct crystallization from wet-process phosphoric acid. A similar opinion is expressed in U.S. Pat. No. 3,912,803.

U.S. Pat. Nos. 4,215,098 and 4,296,082 teach that crystallization of phosphoric acid is to be preceded by a purification step and offer heat treatment processes which serve to bring the phosphoric acid to a concentration about 76% $P_2O_5$ and precipitate dissolved impurities from the acid. Only then is the acid diluted and subjected to crystallization.

U.S. Pat. No. 4,083,934 discloses a process for obtaining purified crystallized orthophosphoric acid from superphosphoric acid. The patent does not address the direct purification of wet-process phosphoric acid or the crystallization of phosphoric acid hemihydrate.

Japanese Pat. No. 14,692, published in 1969, describes a process for purifying phosphoric acid by crystallization. In this patent the patentees point out that, although crystallization would be a desirable method for purifying phosphoric acid, it has not been employed industrially. Working from the assumption that it is the impurities which adversely affect the rate of crystallization, the Japanese patent describes a pre-crystallization process using oxidants which remove not only organic impurities but also inorganic impurities, such as calcium phosphate, calcium sulfate, chromium, vanadium and manganese, followed by further pre-processing to remove fluoride impurities. It is only after such pre-purification, according to this patent, that practical crystallization can be employed.

In the Proceedings of a Conference of Industrial Crystallization, published in 1976, Aoyama and Toyokura describe a process said to bring about crystallization of phosphoric acid from crude wet-process acid concentrated to about 60% $P_2O_5$. Although the authors claim to have operated a pilot-scale crystallizer for as much as two weeks satisfactorily, nothing is said in the description as to conditions of seeding or control which would preclude catastrophic crystallization. As discussed below in the description of the present invention, it is the problem of catastrophic crystallization which the present invention overcomes by proper control of the seeding conditions. The only discussion of seeding in the Aoyama et al. paper refers to control of the circulation rates through different sections of the crystallizer, which are said to affect the number of seed crystals in the growing bed. However, the details of this control are not described. To the extent it is indicated in their process description it appears that the "seed" crystals are, in fact, products of primary crystallization of the wet-process phosphoric acid. In developing the method of the instant invention the inventors have found that such crystals, when used as the sole source of seed, do not provide controllable results.

An object of this invention is to provide a method for controlling the seeding and other conditions required to avoid catastrophic crystallization while crystallizing phosphoric acid. Another object is to provide a method for purifying phosphoric acid by means of crystallization without the need of solvent extraction techniques. Another object is to provide a process for the manufacture of high-purity phosphoric acid from wet-process phosphoric acid by the selective crystallization of phosphoric acid hemihydrate crystals from the impurities normally associated with the wet-process acid. Still another object of the present invention is to provide a method for purifying wet-process phosphoric acid by crystallization of its $P_2O_5$ entity without the continuous use of reagent additives. A further object of the invention is to provide a method for producing a purified phosphoric acid having a higher $P_2O_5$ concentration than the feed acid from which it is made. A still further object is to provide a process for manufacturing concentrated high purity phosphoric acid from wet-process phosphoric acid by means of selective crystallization of the $P_2O_5$ entity in the wet-process acid which process affords the flexibility of simultaneously manufacturing various purity grades of concentrated phosphoric acid products by means of remelting and recrystallizing said products.

RELATED INVENTION

As explained in commonly assigned Application Ser. No. 731,971 of Wiewiorowski et al., it has now been discovered that the occurrence of catastrophic crystallization can be controlled by the addition of relatively large amounts of seed crystals of orthophosphoric acid hemihydrate. For a fuller description of this related invention reference may be had to co-pending Application Ser. No. 731,971, the disclosure of which is hereby incorporated by reference.

As explained in said related application the best recovery of purified phosphoric acid is obtained at the lowest crystallizing temperature, other factors being equal; however, at low temperatures the effect of the additional phosphoric acid crystallized, taken in conjunction with the normal effect of low temperature on liquid viscosity, can greatly increase the viscosity of the magma. Viscous magmas can present processing problems such as increased power required to agitate the magma in the crystallizer and to pump it between processing steps, and increased difficulty in separating the desired crystallized product from the magma. It is therefore a further object of the present invention to provide a method for controlling the seeding and other conditions required to avoid catastrophic crystallization while crystallizing phosphoric acid which method avoids or ameliorates the processing problems normally associated with such controlling of seeding and other conditions as a result of the viscous nature of the phosphoric acid magmas being processed. Another important object is to provide a method that avoids or ameliorates said processing problems by controlling the viscosities of said magmas being processed.

DESCRIPTION OF THE INVENTION

In accordance with the present invention viscosity control in the crystallization step is achieved by recycling raffinate obtained when the crystallized phosphoric acid product is separated from the magma containing it. The raffinate needs to be recycled only to those stages of the crystallization step where it is necessary in order to control the viscosity of the magma. The present invention is applicable to single-stage crystallization, wherein fresh incoming phosphoric acid is combined with recycled magma and cooled to the desired crystallization temperature, whereupon seed crystals of orthophosphoric acid hemihydrate are added in the prescribed amounts. Recycled raffinate can be added either at the start of crystallization or after crystallization has proceeded sufficiently so as to approach unacceptably high magma viscosities. The present invention is also particularly applicable to multi-stage crystallization systems. The initial stage of a multi-stage crystallization system may be operated at relatively high temperatures (albeit within the supersaturation region) such that the viscosity of the crystallized magma from the first stage may not be excessive. In later stages, as the temperature is reduced thereby crystallizing greater amounts of phosphoric acid hemihydrate, the viscosity of the magma can increase substantially. In a multi-stage system, then, recycled raffinate needs to be supplied only to those stages in which the viscotity needs to be lowered.

The recycled raffinate is added in such quantities that the final viscosity of the magma to which the raffinate is added preferably does not exceed 30,000 centipoises and more preferably does not exceed 10,000 centipoises. Typically, acceptable viscosities are found in the crystallizing magma if the solids content is maintained below about 40% by weight. Ordinarily in the practice of the present invention during the primary crystallization stages and depending on the equilibrium amount of crystallized phosphoric acid hemihydrate present in the magma of a particular stage, between 20 and 200 parts of raffinate would be recycled for each 100 parts of fresh concentrated (58–63% $P_2O_5$) phosphoric acid, provided the crystallization temperature is in the range of 0° to 10° C. If the initial crystal product is further purified by secondary or tertiary crystallization, somewhat different conditions of temperature and solids content of the magma may be encountered. The amount of raffinate recycle required for optimum results may be somewhat different in such cases. Similarly, if the fresh acid is less concentrated, or the crystallization temperature is higher, the purified phosphoric acid yield will be reduced, and in these circumstances less recycle raffinate will be needed.

The amount of recycled raffinate should be sufficient to maintain the solids content of the magma in the crystallizers within reasonable limits but not more than necessary, since excessive amounts of recycled raffinate will add a burden to the processing requirements.

DESCRIPTION OF THE RELATED CRYSTALLIZATION PROCESS

The phosphoric acid to which the present invention is applicable is the impure phosphoric acid containing impurities which interfere with crystallization. Such acids can be the ordinary wet-process acid of commerce, typically containing about 54% $P_2O_5$ or the spent acids such as mentioned above. However, the equilibrium freezing point of phosphoric acid hemihydrate from such acids is quite low. For this reason, and to improve the process $P_2O_5$ yields, it is preferred to use an acid containing 58–63% $P_2O_5$.

As used herein, "$P_2O_5$ yield" refers to the percentage of the $P_2O_5$ originally present in the acid fed to the crystallization step which reports in the crystallized phosphoric acid hemihydrate cake. As a practical matter, $P_2O_5$ yields lower than about 20% are considered of little or no interest from a process economics point of view. A preferred phosphoric acid starting material is that prepared in accordance with commonly-assigned U.S. Pat. No. 4,487,750 issued Dec. 11, 1984, to Astley et al. An acid prepared by diluting so-called superphosphoric acid, a commercially available product containing between 69 and 76% $P_2O_5$, to the 58–63% $P_2O_5$ range is also suitable as a starting material.

It is also preferred that the starting material be substantially free of solid impurities before crystallization. Solids present in the starting acid used in the process of this invention may appear as contaminants in the crystallized product when the latter is separated from the raffinate. For that reason, the solids content of the feed acid should be less than 5%, and preferably less than 3%.

Certain impurities influence the process $P_2O_5$ yields, and can affect the equilibrium freezing point of phosphoric acid hemihydrate. It has been found, for instance, that the fluoride ion content affects the $P_2O_5$ yields in wet-process acids. Since wet-process phosphoric acid varies in its impurity content, it may be desirable for best $P_2O_5$ yields when dealing with wet-process acid to assure a fluoride content of at least 0.5% to 0.7%. Many wet-process acids naturally contain 0.7% to 0.9% fluoride. However some acids may be specially processed in ways which reduce the fluoride content, sometimes to as little as 0.2%. In such cases best results are obtained in practicing the present invention by adding enough hydrofluoric acid to increase the fluoride ion content to the range of 0.5%–0.7% for the first stage of crystallization.

In still higher concentration, the fluoride ion has even more beneficial effects. Again with reference to wet-process acid, fluoride ion has been found to permit crystallization under conditions which reduce the viscosity of the crystallizing magma at a given yield level if present in amounts between 1%–2%. Hence even in typical wet-process acid where the fluoride ion content may be between 0.7 and 1%, the addition of HF can have a beneficial effect on processing. Similar results are found when using fluosilicic acid.

The temperature at which crystallization is carried out is also an important process variable. Crystallization liberates heat, and hence it is normal to provide cooling to maintain the crystallizing magma at a suitable temperature in the crystallization apparatus. The temperature should be maintained sufficiently low to assure a good yield of crystallized product. For instance, if the crystallizer is fed with a wet-process acid concentrate containing 61% $P_2O_5$ (equivalent to 84.25% $H_3PO_4$) and operated at a temperature at which the equilibrium freezing point concentration of $P_2O_5$ is 57% (equivalent to 78.73% $H_3PO_4$) the maximum $P_2O_5$ yield of orthophosphoric acid hemihydrate (91.6% $H_3PO_4$) will be around 47%. If the temperature of the crystallizer is lowered the $P_2O_5$ yield will increase in accordance with the reduced equilibrium concentration of $H_3PO_4$ at such lower temperature. On the other hand, operation at too low a temperature relative to the saturation conditions can increase the degree of supersaturation sufficiently to give rise to secondary nucleation, a phenomenon which we desire to suppress. Therefore, the temperature of the crystallizing magma should be maintained sufficiently high to avoid catastrophic crystallization, that is, to substantially suppress secondary nucleation.

The need for maintaining the temperature at a level sufficient to suppress secondary nucleation leads to a preferred embodiment of the present invention for maximizing $P_2O_5$ yield. In this preferred embodiment crystallization is carried out continuously in two or more stages, with magma withdrawn from each stage used or feed the next succeeding stage. Fresh feed is supplied to the first stage and product magma is withdrawn from the last stage. Each stage operates at a lower temperature than the immediately preceding stage. In this manner, the temperature in each stage can be controlled to suppress secondary nucleation, while on an overall basis the temperature can be lowered in the final stage sufficiently to provide a high $P_2O_5$ yield.

The crystallized $H_3PO_4 \cdot \frac{1}{2}H_2O$ obtained by crystallization from wet-process phosphoric acid is substantially purer than the wet-process acid before crystallization. The improvement in purity can be illustrated by the typical data shown in the Table I, below:

TABLE I

| Product Purity From Wet-Process Acid | | |
|---|---|---|
| | Wet-Process | Crystallized Product Cake |
| $P_2O_5$ | 59.6% | 64.6% |
| $SO_4$ | 3.5 | 0.16 |
| $Fe_2O_3$ | 1.7 | 0.22 |
| $Al_2O_3$ | 1.6 | 0.14 |
| F | 0.9 | 0.08 |
| MgO | 0.7 | 0.04 |
| Carbon | 0.2 | 0.04 |

For some applications the first-crop product may be sufficiently pure. However it is still quite discolored and insufficiently purified for many purposes. The first-crop product can be further purified by washing and/or secondary crystallization. Thus, for example, washing of the first-crop product followed by heating will cause it to melt at around 25°–30° C. The melted material can then be cooled, reseeded, and recrystallized. The product of the secondary crystallization can be wahed and-/or remelted and recrystallized to obtain a tertiary product, if desired. The improvement in purity resulting from such second and third crystallization is illustrated by the data shown in Table II, below:

TABLE II

| Effect of Recrystallization on Product Purity | | | | |
|---|---|---|---|---|
| | Wet-Process Acid | Product Cake of Primary Crystallization | Product Cake of Secondary Crystallization | Product Cake of Tertiary Crystallization |
| $P_2O_5$ | 60.8% | 64.3% | 64.6% | 64.9% |
| $Fe_2O_3$ | 1.89 | 0.3 | 0.06 | 0.01 |
| $Al_2O_3$ | 2.07 | 0.3 | 0.05 | 0.004 |
| MgO | 0.91 | 0.16 | 0.02 | 0.001 |
| $SO_4$ | 4.30 | 0.67 | 0.14 | 0.05 |
| F | .87 | 0.1 | 0.01 | 0.01 |
| Carbon | 0.2 | 0.04 | 0.01 | 0.006 |

The tertiary acid has a purity and color suitable for many applications.

The selection of seed crystals is a third important process variable. Seed crystals used in the present invention should be fine, relatively pure and used in a sufficient quantity that supersaturation will be relieved by crystal growth before a significant amount of secondary nucleation occurs.

In the early tests of the present invention, we found that fine crystals of $H_3PO_4 \cdot \frac{1}{2}H_2O$ obtained by adding a small amount of seed to a supersaturated solution of reagent grade phosphoric acid gave excellent results. This provided seeds which were of high purity and small size, i.e., in the order of 0.12 mm in the longest dimension. We have also found that wet-process phosphoric acid which has been crystallized at least twice will yield good seed crystals. On the other hand, we have found that relatively impure crystals at seed crystal addition rates of 8% to 15%, are relatively less effective to produce good results even if fine in particle size. We have observed, for example, that good results are obtained when the seed crystals of $H_3PO_4 \cdot \frac{1}{2}H_2O$ contain less than 0.1% iron (as $Fe_2O_3$) and have a crystal length of less than 0.3 millimeter. Also, the acid from which the seeds are made should preferably have a $P_2O_5$ concentration of between 58% and 63%.

Seed crystals may be conveniently generated on batch basis as described above. Such seed is largely composed of material resulting from secondary nucleation with little opportunity for crystal growth. If such a batch of seed is kept insulated, it can be used from time to time as needed. Seed crystals can also be prepared by a method such as described in commonly assigned co-pending application Ser. No. 731,969 of Astley et al. Thus, for example, a seed crystal generator has been designed to which fresh, cold acid is supplied continuously, and the residence time in the generator is limited so that the seed is formed largely by rapid nucleation before there is a significant opportunity for crystal growth.

An important aspect of the process to which the present invention is applicable relates to the amount of seed added. That amount should be sufficient to preclude massive or catastrophic crystallization which, as already mentioned, results in a viscous mass in which the phosphoric acid hemihydrate crystals cannot be separated from the mother liquor. As explained above, we believe that the occurrence of such catastrophic crystallization is the result of secondary nucleation which is not adequately suppressed.

In continuous processing, seed may be added periodically or continuously; however, if it is added periodically, the frequency should be sufficient to maintain crystal growth at a rate which will prevent catastrophic crystallization. When a continuous crystallization mode, crystal production may not be self sustaining without seed crystal addition. We have observed that in such continuous operation if seeding is suspended, crystallization will either cease, or catastrophic crystallization will ensue.

The amount of seed required to afford controlled crystal growth is dependent upon the amount of supersaturation of the solution being recrystallized, the size of the seed crystals and seed crystal purity. In a typical case, a wet-process phosphoric acid of about 60% $P_2O_5$ is cooled to between 0° and 5° C. in the crystallizer. In such a system we use at least 2% seed crystals based on the weight of crude acid, and typically we provide about 5% fine, high-purity seed crystals. The amount of time allowed for crystal growth also affects the amount of seed required. In a typical batch process where 5% seed is added, a near equilibrium product is obtained in about 6 hours. If half that amount of seed is used, the crystallization time required to obtain about the same yield will approximately double.

To illustrate the range of variables which affect the $P_2O_5$ yield and the degree of difficulty associated with the separation of the crystallized product by centrifugation a series of tests were made using seed crystals of varying origins and in various amounts, as shown in Table III, below. In this series of tests we used simple batch crystallization in laboratory-scale equipment having a stirrer rotating at 100 rpm and a total crystallization time of about 6 hours at the stated temperatures. The starting material was concentrated wet-process phoshoric acid at about 60% $P_2O_5$.

TABLE III

| Effect of Seed Addition | | | | | |
|---|---|---|---|---|---|
| Test No. | Temperature | % Seed | Seed Origin | $P_2O_5$ Yield | Comments |
| 1 | 4° C. | 5 | Furnace Acid | 44% | Easy separation |
| 2 | 4° C. | 3 | Furnace Acid | 33% | Easy separation |
| 3 | 4° C. | 2 | Furnace Acid | 30% | Easy separation |
| 4 | 4° C. | 1 | Furnace Acid | 16% | Viscous, difficult separation |
| 5 | 4° C. | 5 | Product from Test 1 | 13% | Viscous, difficult separation |
| 6 | 4° C. | 1 | Product from | 3% | Viscous, diffi- |

TABLE III-continued

| | | Effect of Seed Addition | | | |
|---|---|---|---|---|---|
| Test No. | Temperature | % Seed | Seed Origin | $P_2O_5$ Yield | Comments |
| | | | Test 1 | | cult separation |

In the foregoing table the furnace acid seed crystals were of a size in the order of 0.1 mm long. The crystals used for seeding in Tests 5 and 6 were those obtained in Test 1. These crystals were longer than 0.3 mm.

As can be seen from the above data the best results were obtained when the wet-process acid was seeded with furnace acid seeds in amounts substantially higher than 1% by weight of wet-process acid.

In carrying out crystallization in stages, as suggested above, the viscosity of the magma can become quite high as crystallization progresses, particularly at lower temperatures, even in the absence of catastrophic crystallization or secondary nucleation. Magmas having excessively high viscosities, for example over 30,000 centipoises, become very difficult to process. Larger amounts of energy are required to maintain agitation, pumping costs increase, and separation of the product from the magma derived from the last stage by filtration or centrifuging becomes more difficult. It is desirable therefore to maintain viscosity below about 30,000 centipoises, and preferably below 10,000 centipoises. In accordance with the present invention, it has been discovered that raffinate obtained from the magma derived from the final stage can be recycled to the crystallizers to reduce the viscosity therein. This expedient is particularly desirable in staged separations.

The present invention was tested using the apparatus illustrated in the figure. The apparatus consisted of three successive crystallizers 1, 2 and 3 of approximately 5 gallons each. Each crystallizer was provided with an overflow spout (respectively 4, 5 and 6) with the final product overflow from crystallizer 3 entering a magma collection vessel 7. The magma in vessel 7, consisting of a mixture of crystallized phosphoric acid and raffinate, was separated into its components by a centrifuge in a separate step (not shown). Drum 8 of phosphoric acid which had previously been concentrated to approximately 60% $P_2O_5$ were used to supply feed which was pumped by feed pump 9 through feed supply line 10 into crystallizer 1.

Each crystallizer was fitted with a spiral stainless steel cooling coil (indicated by fragments 12, 13, and 14) which maintains the temperature of the respective crystallizing containers. Each of the cooling coils was fitted with coolant supply and return lines 15, 16 and 17 connected to a common coolant supply (not shown). Each crystallizer was also fitted with an agitator driven by an electric motor (18, 19 and 20).

In the operation of the staged crystallizer shown in the drawing it was found that the viscosity in the second and third stages had to be controlled. Excessive viscosity was noted when the current required to operate the stirrers 19 and 20 in these two stages became excessive. To avoid excessive viscosities, provision was made to recycle raffinate obtained from the centrifugation of the magma accumulated in vessel 7 from one or more preceding centrifugations. Such raffinate was stored in a raffinate cooling tank 24 provided with a cooling coil 25 (fragments shown) and a stirrer driven by electric motor 26. The cooling coil 25 was provided with coolant from the same common cooling source previously referred to through coolant supply and return lines 27. Raffinate was pumped to each of the second and third stages by raffinate recycle pumps 30 and 31 through raffinate supply lines 32 and 33.

Seed crystals were supplied to stage 1 through feed crystal supply line 34. In the experiments described hereinbelow the seed crystals were added batchwise about every thirty minutes.

The seed crystals were prepared from a solution of reagent grade phosphoric acid (85% $H_3PO_4$, 61.6% $P_2O_5$ and specific gravity of 1.7) which was quiescently cooled to a temperature between $-5°$ and $-10°$ C. in plastic beakers. Upon adding one or two crystals to the cooled acid, copious amounts of seed nuclei were rapidly formed, which formation was accelerated by vigorous agitation. The phosphoric acid nearly solidified within five seconds and then broke up into a thick seed slurry as agitation was continued. Agitation was continued for approximately one minute to break up lumps of seed crystals.

The seed slurry thus made usually contains 25% to 40% seed solids, depending upon the original acid strength and temperature prior to seed formation. The final temperature typically equilibrated between 15° and 25° C. The final seed size, measured by optical microscopy, was approximately 0.1 mm in length.

EXAMPLE 1

The crystallizer described above was employed to provide three-stage cooling to crystals of primary crystallization at a temperature reaching 0° C. in stage 3.

The operating conditions for purposes of this experiment were:

Coolant: The coolant used to supply all three stages as well as the raffinate recycle drum was a 50% ethylene glycol-water mixture maintained at a temperature of approximately $-6°$ C.

Feed Acid: The feed acid was a concentrated wet-process phosphoric acid which had been clarified to remove solid impurities. The feed acid analyzed 60% $P_2O_5$, 0.9% F, 1.7% $Fe_2O_3$, 3.7% $SO_4$, and contained less than 1% solids. It was supplied to stage 1 at 20° C. at a rate of 155 ml/min. In the feed tank the acid had a specific gravity of 1.85 and a viscosity of 180 cp.

Raffinate Recycle: Raffinate from previous runs had been accumulated in the raffinate cooling tank and cooled to a temperature of 2° C. The raffinate in this test had a specific gravity of 1.81 and a viscosity of about 1000 cp. It was supplied to stage 2 at a flow rate of 60 ml/min. and to stage 3 at a flow rate of 40 ml/min.

Seed Slurry: The seed slurry was prepared in 600 ml batches from furnace-grade acid having a specific gravity of 1.7 as described above. One batch was added to stage 1 each half hour. This amounts to an average of about 20 ml/min. of seed slurry, which in this test had a concentration between 25% and 41% solids.

Crystallizer Conditions: The three crystallizers were operated in the following conditions:

TABLE IV

| Conditions for Example 1 | | | |
|---|---|---|---|
| | Stage 1 | Stage 2 | Stage 3 |
| Magma Temperature, °C. | 10 | 2 | 0 |
| Coolant Flow, ml/min | 1150 | 1100 | 1200 |
| Coolant Inlet Temperature, °C. | $-4$ | $-4$ | $-4$ |

TABLE IV-continued

| Conditions for Example 1 | | | |
|---|---|---|---|
| | Stage 1 | Stage 2 | Stage 3 |
| Coolant Exit Temperature, °C. | 2 | −1 | −3 |
| % Solids Content | 40 | 38 | 36 |
| Raffinate Feed Rate, ml/min | — | 60 | 40 |
| Magma Viscosity, 000's, cp | 4–7 | 7–13 | 6–16 |
| Specific Gravity | 1.90 | 1.89 | 1.88 |
| Specific Heat | 0.354 | 0.262 | 0.317 |

Product Centrifugation: The product from the third stage of crystallization, which collected in vessel 7 at a temperature of 0° C., had a solids content of 36%. During centrifugation raffinate was removed at a rate of approximately 0.48 gallon/min.ft$^2$. The product had a cake density of 80 lbs/ft$^3$. The presence of occluded raffinate in the filter cake tends to detract from the purity of the resultant product. While the filter cake can be washed with water, significant phosphoric acid losses can occur. Preferably, therefore, the centrifuged cake is washed with phosphoric acid. Melted primary crystals and/or furnace-grade acid can be used.

Using the foregoing conditions, a four-day run was carried out in which phosphoric acid was continuously crystallized. As indicated, the run was commenced by seeding cooled feed acid with a batch of furnace-grade seed crystals. The initial amount of seed corresponded to approximately 4 to 5% by weight of the feed acid. The periodic addition of seed crystals each half hour during the course of the run corresponded to between 3.4 and 5% by weight of the feed acid rate.

As the first stage filled, product therefrom was allowed to overflow into stage 2; and when stage 2 filled, the product overflowed to stage 3. Coolant rates in each of the stages 2 and 3 were set at 500 ml/min. as each stage filled. As indicated above, cooled, recycled raffinate was pumped at 60 and 40 ml/min., respectively, to stages 2 and 3 throughout the run in order to maintain a manageable solids content in each stage. A solids content of 30% and 38% appeared to be satisfactory.

Over a period of twelve hours of initial operation the coolant flows were gradually increased until an equilibrium temperature in stage 3 of 0° C. was obtained. Thereafter coolant flows were held at 1100–1200 ml/min. At this time the solids contents and viscosities of stages 1, 2 and 3 were, respectively, 38% and 5300 cp., 36% and 7700 cp., and 34% and 9600 cp. Over the ensuing twenty four hours, the motor torques continued to increase until a steady state operation was achieved and the solids contents of the stages were not materially changing. At this time the solids content of stage 1 was 41%; that of stage 2 was 38%; and that of stage 3 was 36%. Viscosities, as indicated by the motor torques, had increased significantly to 7000, 13000 and 16000 cp. for the respective stages. The steady state solids content achieved in stage 3 was approximately 36%. This represented a P$_2$O$_5$ yield of 57% from the starting feed acid.

The product was centrifuged in a laboratory scale machine at 2100 rpm (876 g's). During the centrifugation step the maximum raffinate rate was found to be approximately 0.48 gal/min ft$^2$. The finished product had a cake density of 80 lb/ft$^3$. Initially the centrifuged cake contained approximately 65% P$_2$O$_5$ and 0.52% iron (as Fe$_2$O$_3$). Washing the centrifuged cake with ice cold water (5 gm water/100 gm cake) reduced the iron content to approximately 0.18%, although this resulted in a loss of approximately 33% of the cake weight. Washing with furnace-grade acid in an amount effective to provide about 5–10 grams of furnace-grade acid to 100 grams of cake was effective to reduce the iron content to as little as 0.16% while limiting the loss of cake to 13%. In another test the cake was washed with melted primary cake (65% P$_2$O$_5$). This limited the cake loss to the same order of magnitude, but was somewhat less effective in reducing its iron content.

At the conclusion of the run seed crystal addition to stage 1 was discontinued, but feed acid continued to flow. Some three hours after the last seed addition the solid content from stage 3 had fallen from 36% to 23%. Over the next six hours solids content further declined to 4%. The temperature was held at 5° C. throughout this period. This demonstrated that, in the present invention, the continuous crystallization process is not self-sustaining in the absence of continuous or intermittent seeding.

EXAMPLE 2

A further test of the present invention was made using a single stage of the three-stage crystallizer described above. One stage was filled with 2.25 gallons of fresh feed acid (60% P$_2$O$_5$) and 2.25 gallons of the raffinate from Example 1. The mixture was cooled to approximately 5° C. and then seeded with 2200 grams of the same batch-prepared furnace acid seed slurry used in Example 1. This amounted to approximately 5% by weight seed based on fresh acid feed. Coolant flow in this test was initially maintained at 1100 ml/min., i.e., simiar to the cooling rate used when each stage was run continuously. During the run, however, the coolant flow was gradually reduced as the magma approached 0° C. at the conclusion of the six-hour run.

At the conclusion of the run the product was centrifuged to yield a cake having 65% P$_2$O$_5$ and 0.44% Fe$_2$O$_3$. The net P$_2$O$_5$ yield from the phosphoric acid at 0° C. calculated to be 60%.

EXAMPLE 3

In another test, batch crystallization was evaluated in a manner similar to that occurring in each successive stage of a continuous crystallizer. In this test a single stage in the three-stage crystallizer apparatus described above was employed.

Stage 1 of the crystallizer was initially filled with 4.5 gallons of 60% P$_2$O$_5$ wet-process phosphoric acid. The acid was cooled to about 4° C. and seeded with 4483 grams of furnace-grade seed slurry prepared as described above. Coolant flow rate was maintained at 1100 ml/min.

When the solids content approached 35% approximately 1.16 gallons of magma were withdrawn and 1.24 gallons of raffinate from an earlier run were added. Later as the solids content again approached 35%, approximately 0.6 gallon of magma was withdrawn and replaced with approximately 0.7 gallon of additional cold raffinate. Throughout this time the temperature of the crystallizing magma decreased. As the temperature approached 0° C. coolant flow rate was reduced so as to maintain that temperature at the conclusion of the run. After six hours the product was centrifuged to yield a cake having 64% P$_2$O$_5$ and 0.60% Fe$_2$O$_3$. The raffinate was analyzed and found to contain 54% P$_2$O$_5$ and 2.72% Fe$_2$O$_3$. The net P$_2$O$_5$ yield in this run was calculated to be 57%.

EXAMPLE 4

This example demonstrates the effect of magma viscosity on equipment power requirements. A 4.8 gallon sample of wet-process phosphoric acid prepared in accordance with the aforementioned commonly-assigned U.S. Pat. No. 4,487,750 was crystallized by the process disclosed in the present invention with the exception that no raffinate recycle was used. During crystallization, the sample was agitated using an agitator driven by an electric motor. Table V, following, shows the relationship between magma viscosity and the electrical power requirements of the agitator motor.

TABLE V
EFFECT OF MAGMA VISCOSITY ON AGITATOR POWER CONSUMPTION

| Viscosity (000 Centipoises) | Power (Horsepower) |
|---|---|
| 6.8 | .030 |
| 9.0 | .040 |
| 11.0 | .046 |
| 12.5 | .052 |
| 15.5 | .064 |
| 25.0 | .087 |
| 32.7 | .112 |
| 41.5 | .130 |

Table V clearly shows that increases in magma viscosity causes corresponding increases in power requirements to drive equipment operating in the magma.

We claim:

1. In a method for crystallizing phosphoric acid comprising
   (i) adding to a crystallizing vessel a phosphoric acid feed having a $P_2O_5$ concentration of at least about 50% by weight but not in excess of about 66% by weight maintaining it in said vessel at a temperature at which it is supersaturated with respect to orthophosphoric acid hemihydrate and dispersing seed crystals of orthophosphoric acid hemihydrate in said acid in an amount of at least 2% by weight of the phosphoric acid, and at a rate, effective to substantially prevent said phosphoric acid from becoming a viscous, inseparable mass;
   (ii) maintaining at least a portion of said phosphoric acid and seed crystals of orthophosphoric acid hemihydrate under agitation for a residence time sufficient to form a magma of crystallized orthophosphoric acid hemihydrate having an average crystal size larger than that of the seed crystals and a liquid phase mother liquor raffinate containing the bulk of the impurities while controlling the temperature of said magma to substantially prevent the occurence of a viscous, inseparable mass; and
   (iii) thereafter withdrawing said magma and separating said crystallized orthophosphoric acid hemihydrate from said liquid phase mother liquor raffinate,
      the improvement comprising recycling a sufficient portion of said raffinate to the crystallization step to maintain the solids content of the magma in said crystallizing vessel below 40% by weight.

2. In a method for purifying phosphoric acid containing impurities, comprising
   (i) subjecting a phosphoric acid feed having a $P_2O_5$ concentration of at least about 50% by weight but not in excess of about 66% by weight to crystallization by maintaining it at a temperature at which it is supersaturated with respect to orthophosphoric acid hemihydrate in a plurality of crystallizers having at least a first crystallizer and a last crystallizer wherein the phosphoric acid is added to said first crystallizer and dispersing seed crystals of orthophosphoric acid hemihydrate to at least said first crystallizer in an amount of at least 2% by weight of said phosphoric acid added thereto effective to substantially prevent said phosphoric acid from becoming a viscous, inseparable mass;
   (ii) maintaining at least a portion of said phosphoric acid and seed crystals of orthophosphoric acid hemihydrate in each of said plurality of crystallizers under agitation for a residence time sufficient to form a magma of crystallized orthophosphoric acid hemihydrate having an average crystal size larger than that of the seed crystals and a liquid phase mother liquor raffinate containing the bulk of the impurities while controlling the temperature of the magma in each crystallizer to substantially prevent the occurrence of a viscous, inseparable mass;
   (iii) withdrawing magma from said first crystallizer, supplying said withdrawn magma to the next crystallizer in order, withdrawing magma for each successive crystallizer and supplying it to the next crystallizer in order, and withdrawing product magma from said last crystallizer, each crystallizer being maintained at a temperature at which the phosphoric acid therein is supersaturated with respect to orthophosphoric acid hemihydrate and each crystallizer being maintained at a lower temperature than the immediately preceding crystallizer; and
   (iv) separating the product crystallized orthophosphoric acid hemihydrate contained in said product magma withdrawn from the last crystallizer from the liquid phase mother liquor raffinate associated therewith,
      the improvement comprising recycling a portion of said liquid phase mother raffinate from said last crystallizer to at least one of said preceding crystallizers and maintaining the solids content of the magma in said at least one preceding crystallizer to which said raffinate is recycled at below 40% by weight.

3. The method according to claim 1 or 2 wherein the proportion of said raffinate which is recycled is between 20 and 200 parts of each 100 parts of phosphoric acid feed.

4. A method according to claim 3 wherein the amount of raffinate recycled to each crystallizer is effective to maintain the viscosity of the magma substantially below 30,000 centipoises.

5. A method according to claim 3 wherein the amount of raffinate recycled to each crystallizer is effective to maintain the viscosity of the magma substantially below 10,000 centipoises.

* * * * *